(12) United States Patent
Kashiwagi et al.

(10) Patent No.: US 9,291,313 B2
(45) Date of Patent: Mar. 22, 2016

(54) WAVELENGTH CONVERSION ELEMENT, LIGHT SOURCE DEVICE, AND PROJECTOR

(71) Applicant: SEIKO EPSON CORPORATION, Tokyo (JP)

(72) Inventors: Akihiro Kashiwagi, Shiojiri (JP); Shigeo Nojima, Azumino (JP); Akira Miyamae, Suwa-gun (JP)

(73) Assignee: SEIKO EPSON CORPORATION, Tokyo (JP)

( * ) Notice: Subject to any disclaimer, the term of this patent is extended or adjusted under 35 U.S.C. 154(b) by 130 days.

(21) Appl. No.: 13/758,499

(22) Filed: Feb. 4, 2013

(65) Prior Publication Data

US 2013/0201458 A1    Aug. 8, 2013

(30) Foreign Application Priority Data

Feb. 7, 2012    (JP) ................. 2012-024055

(51) Int. Cl.
| | |
|---|---|
| *G03B 21/14* | (2006.01) |
| *F21K 99/00* | (2010.01) |
| *H05B 33/00* | (2006.01) |
| *G03B 21/20* | (2006.01) |
| *H05B 33/10* | (2006.01) |
| *H05B 33/14* | (2006.01) |

(52) U.S. Cl.
CPC . *F21K 9/56* (2013.01); *G03B 21/14* (2013.01); *G03B 21/204* (2013.01); *H05B 33/00* (2013.01); *H05B 33/10* (2013.01); *H05B 33/14* (2013.01); *Y10T 428/269* (2015.01)

(58) Field of Classification Search
CPC .......... G03B 21/16; G03B 21/14; F21K 9/56; H05B 33/00

USPC ........................ 348/743; 353/84, 85
See application file for complete search history.

(56) References Cited

U.S. PATENT DOCUMENTS

| | | | | |
|---|---|---|---|---|
| 7,547,114 | B2* | 6/2009 | Li et al. ................. | 362/231 |
| 2002/0084745 | A1* | 7/2002 | Wang et al. ............ | 313/498 |
| 2008/0074029 | A1 | 3/2008 | Suehiro | |
| 2008/0206910 | A1 | 8/2008 | Soules et al. | |
| 2008/0284315 | A1 | 11/2008 | Tasumi et al. | |
| 2009/0185589 | A1* | 7/2009 | Hattori et al. .......... | 372/22 |
| 2010/0328617 | A1* | 12/2010 | Masuda .................. | 353/31 |
| 2011/0051102 | A1 | 3/2011 | Ogura et al. | |
| 2011/0149549 | A1* | 6/2011 | Miyake .................. | 362/84 |
| 2011/0292349 | A1 | 12/2011 | Kitano et al. | |

(Continued)

FOREIGN PATENT DOCUMENTS

| | | |
|---|---|---|
| JP | A 2008-71837 | 3/2008 |
| JP | 2008-078225 A | 4/2008 |

(Continued)

OTHER PUBLICATIONS

Nov. 20, 2014 Office Action issued in U.S. Appl. No. 13/758,385.

(Continued)

*Primary Examiner* — William C Dowling
*Assistant Examiner* — Jerry Brooks
(74) *Attorney, Agent, or Firm* — Oliff PLC (57) ABSTRACT

A wavelength conversion element includes a phosphor layer that includes phosphors and a binder. The thickness of a phosphor region obtained by multiplying the thickness of the phosphor layer by the volume concentration of the phosphor is equal to or larger than 15 μm.

14 Claims, 6 Drawing Sheets

(56) References Cited

U.S. PATENT DOCUMENTS

| | | |
|---|---|---|
| 2011/0310349 A1 | 12/2011 | Yanai |
| 2011/0310362 A1 | 12/2011 | Komatsu |
| 2013/0076234 A1 | 3/2013 | Enomoto et al. |

FOREIGN PATENT DOCUMENTS

| | | |
|---|---|---|
| JP | 2009-231785 A | 10/2009 |
| JP | A 2010-4034 | 1/2010 |
| JP | A 2010-4035 | 1/2010 |
| JP | A 2010-157638 | 7/2010 |
| JP | 2011-012215 A | 1/2011 |
| JP | A 2011-53320 | 3/2011 |
| JP | A 2011-91068 | 5/2011 |
| JP | 2011-168627 A | 9/2011 |
| JP | 2012-003923 A | 1/2012 |
| JP | 2012-018209 A | 1/2012 |
| JP | 2012-018762 A | 1/2012 |
| JP | A 2012-74273 | 4/2012 |
| JP | A 2012-83695 | 4/2012 |
| JP | 2013-072041 A | 4/2013 |

OTHER PUBLICATIONS

Jun. 24, 2015 Office Action issued in U.S. Appl. No. 13/758,385.

* cited by examiner

RELATION BETWEEN CONCENTRATION AND FILM QUALITY

| CONCENTRATION | 40Vol% | 50Vol% | 60Vol% | 70Vol% |
|---|---|---|---|---|
| FILM QUALITY | ○ | ○ | × | × |

FIG. 7

WAVELENGTH CONVERSION ELEMENT, LIGHT SOURCE DEVICE, AND PROJECTOR

BACKGROUND

1. Technical Field

The present invention relates to a wavelength conversion element, a light source device, and a projector.

2. Related Art

In recent years, in relation to improvement of the performance of a projector, a light source device including a laser light source and a phosphor layer excited by laser light, which is emitted from the laser light source, to emit fluorescent light is known as a light source device having a wide color gamut and high efficiency (see, for example, JP-A-2010-4035).

However, in the related art, although a condition under which high light emission efficiency can be obtained is specified by a weight ratio of phosphors, it is hard to say that the high light emission efficiency can be obtained in the entire range which is specified in the related art.

SUMMARY

An advantage of some aspects of the invention to provide a wavelength conversion element, a light source device, and a projector with which high light emission efficiency can be obtained.

As a result of earnest researches, the inventors have found that light emission efficiency depends on an amount of phosphors contained in the thickness direction of a phosphor layer. Specifically, the inventors have found that, when the amount of phosphors is small, the light emission efficiency decreases because components of excitation light not converted into fluorescent light increase and, on the other hand, when the amount of phosphors is too large, the light emission efficiency decreases because fluorescent light emitted by some phosphors and absorbed by the other phosphors increases. The inventors have obtained knowledge that it is possible to obtain a wavelength conversion element having high light emission efficiency by specifying the thickness of a phosphor region obtained by multiplying the thickness of the phosphor layer by the volume concentration of the phosphors. The inventors have completed the invention on the basis of the knowledge described above.

An aspect of the invention is directed to a wavelength conversion element including a phosphor layer, the phosphor layer including phosphors and a binder, wherein the thickness of a phosphor region obtained by multiplying the thickness of the phosphor layer by the volume concentration of the phosphors is equal to or larger than 15 µm.

With the wavelength conversion element according to the aspect, since the thickness of the phosphor region is equal to or larger than 15 µm, it is possible to obtain high light emission efficiency as indicated by a result explained below.

In the wavelength conversion element, it is preferable that the thickness of the phosphor region is equal to or larger than 20 µm. With this configuration, since the thickness of the phosphor region is equal to or larger than 20 µm, it is possible to obtain higher light emission efficiency as indicated by the result explained below.

In the wavelength conversion element, it is preferable that the thickness of the phosphor region is equal to or smaller than 60 µm. With this configuration, since the thickness of the phosphor region is equal to or smaller than 60 µm, it is possible to obtain high light emission efficiency.

In the wavelength conversion element, it is preferable that the thickness of the phosphor region is equal to or smaller than 55 µm. With this configuration, since the thickness of the phosphor region is equal to or smaller than 55 µm, it is possible to obtain higher light emission efficiency.

In the wavelength conversion element, it is preferable that the volume concentration of the phosphors is set equal to or higher than 15 vol % and equal to or lower than vol %. With this configuration, since the volume concentration of the phosphors is set equal to or higher than 15 vol % and equal to or lower than 50 vol %, it is possible to obtain high light emission efficiency. Further, it is possible to efficiently use light emitted from the phosphors.

In the wavelength conversion element, it is preferable that the phosphor layer emits light including any one or more colors of red and green according to irradiation of excitation light. With this configuration, it is possible to obtain, at high light emission efficiency, fluorescent light including at least one of red and green.

Another aspect of the invention is directed to a light source device including the wavelength conversion element and an excitation light source configured to excite the wavelength conversion element.

With the light source device according to this aspect, since the light source device includes the wavelength conversion element with which high light emission efficiency can be obtained as explained above, the light source device itself including the wavelength conversion element has high light emission efficiency and high reliability.

In the light source device, it is preferable that the excitation light source is a solid-state light-emitting element that emits light in a blue wavelength band. With this configuration, since the solid-state light-emitting element that emits light in the blue wavelength band is used, it is possible to use excitation light as, for example, blue light in a display device.

In the light source device, it is preferable that the excitation light source includes a plurality of the solid-state light-emitting elements. With this configuration, since the excitation light source includes the plurality of solid-state light-emitting elements, it is possible to satisfactorily irradiate the excitation light on the wavelength conversion element.

In the light source device, it is preferable that the excitation light source is a laser diode. With this configuration, since the excitation light source is the laser diode, it is possible to reduce power consumption.

In the light source device, it is preferable that an irradiation position of excitation light on the phosphor layer by the excitation light source is sequentially changed by rotating the phosphor layer. With this configuration, since the irradiation position of the excitation light on the phosphor layer is sequentially changed, it is possible to prevent the phosphor layer from being overheated by local irradiation of the excitation light.

Still another aspect of the invention is directed to a projector including the light source device, a light modulation element configured to modulate, according to an image signal, light emitted from the light source device, and a projection optical system configured to project the light modulated by the light modulation element.

With the projector, since the projector includes the light source device with which high light emission efficiency can be obtained as explained above, the projector itself including the light source device has high light emission efficiency and high reliability.

BRIEF DESCRIPTION OF THE DRAWINGS

The invention will be described with reference to the accompanying drawings, wherein like numbers reference like elements.

DESCRIPTION OF EXEMPLARY EMBODIMENTS

An embodiment of the invention is explained below with reference to the accompanying drawings. The embodiment indicates a mode of the invention and does not limit the invention. The embodiment can be arbitrarily changed within the scope of the technical idea of the invention. In the drawings referred to below, to facilitate understanding of components, scales, numbers, and the like of the components are different from those in actual structure.

Figure 1:
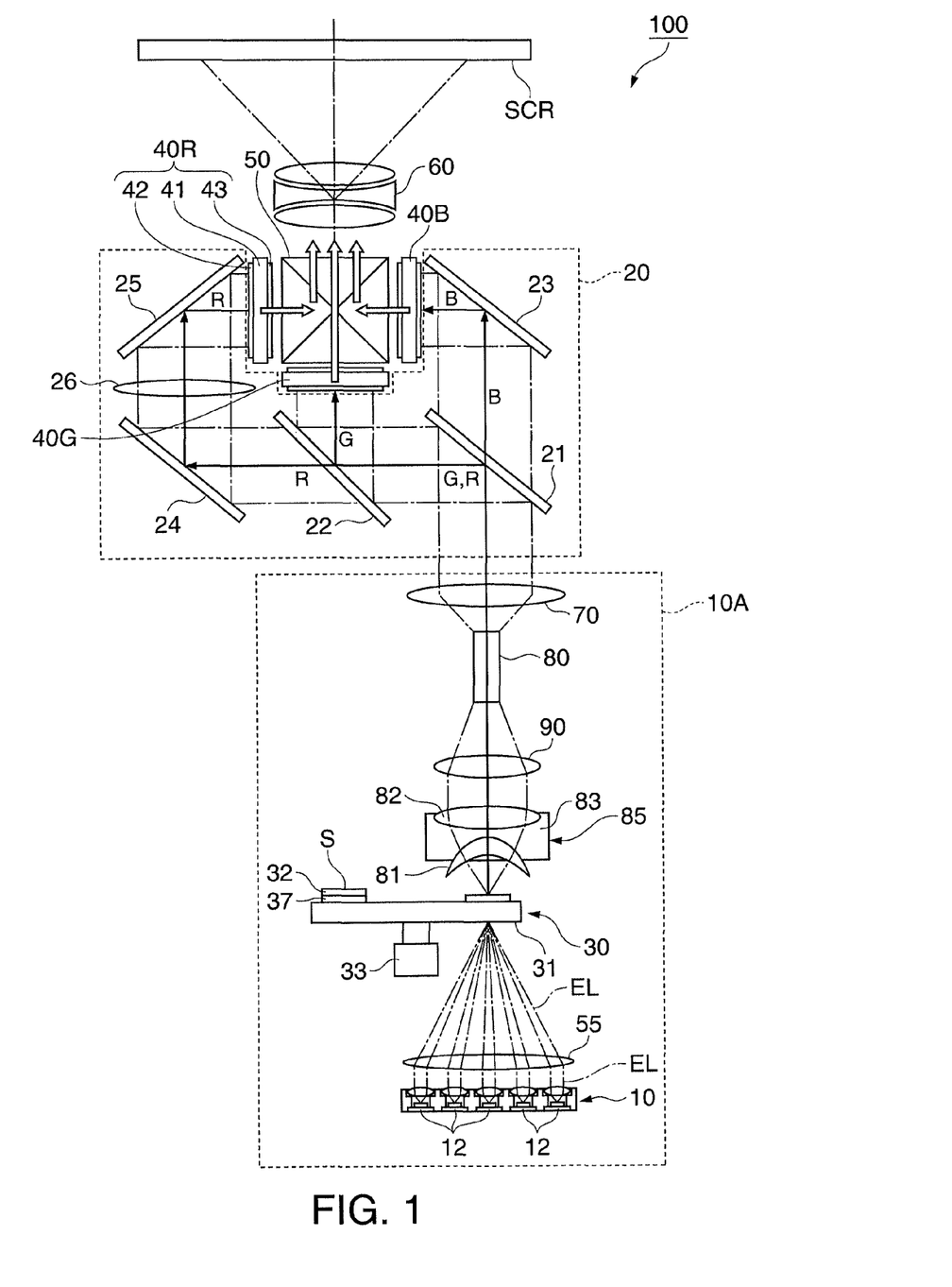
FIG. 1 is a schematic diagram showing an optical system of a projector.

FIG. 1 is a schematic diagram showing an optical system of a projector including a lighting apparatus to which the light source device according to the embodiment of the invention is applied. As shown in FIG. 1, a projector 100 includes a light source device 10A, a color separation and light guide optical system 20, a liquid crystal light modulation device 40R, a liquid crystal light modulation device 40G, and a liquid crystal light modulation device 40B functioning as light modulation devices, a cross-dichroic prism 50, and a projection optical system 60. The light source device 10A includes an excitation light source 10, a first condensing lens 55, a rotating fluorescent plate 30, a collimate optical system 85, a second condensing lens 90, a rod integrator 80, and a parallelizing lens 70. On an optical path of excitation light EL emitted from the excitation light source 10, the first condensing lens 55, the rotating fluorescent plate 30, the collimate optical system 85, the second condensing lens 90, the rod integrator 80, and the parallelizing lens 70 are arranged in this order.

The excitation light source 10 includes a laser light source array in which a plurality of laser light sources 12 are two-dimensionally arrayed along the row direction and the column direction. The laser light source array configures a solid-state light-emitting element in the embodiment of the invention.

The laser light source 12 includes a laser diode that emits laser light in a blue wavelength band (having a peak of light emission intensity near wavelength of 450 nm) as the excitation light EL for exciting phosphor materials included in the rotating fluorescent plate 30 explained below. Since the laser light source 12 including the laser diode is used in this way, it is possible to reduce power consumption of the excitation light source 10. The laser light source 12 may be an excitation light source that emits color light having peak wavelength other than 450 nm as long as the color light is light having wavelength capable of exciting the phosphor materials explained below.

The color separation and light guide optical system 20 includes a dichroic mirror 21, a dichroic mirror 22, a reflecting mirror 23, a reflecting mirror 24, a reflecting mirror 25, and a relay lens 26. The color separation and light guide optical system 20 has a function of separating light from the light source device 10A into red light, green light, and blue light and guiding the red light, the green light, and the blue light respectively to the liquid crystal light modulation device 40R, the liquid crystal light modulation device 40G, and the liquid crystal light modulation device 40B, which are lit by the color lights.

The dichroic mirror 21 and the dichroic mirror 22 are mirrors obtained by forming, on substrates, wavelength selecting and transmitting films that reflect lights in predetermined wavelength regions and transmit lights in other wavelength regions. Specifically, the dichroic mirror 21 transmits a blue light component and reflects a red light component and a blue light component. The dichroic mirror 22 reflects the green light component and transmits the red light component.

The reflecting mirror 23, the reflecting mirror 24, and the reflecting mirror 25 are mirrors that reflect lights made incident thereon. Specifically, the reflecting mirror 23 reflects the blue light component transmitted through the dichroic mirror 21. The reflecting mirror 24 and the reflecting mirror 25 reflect the red light component transmitted through the dichroic mirror 22.

The blue light transmitted through the dichroic mirror 21 is reflected by the reflecting mirror 23 and made incident on an image forming region of the liquid crystal light modulation device 40B for blue light. The green light reflected by the dichroic mirror 21 is further reflected by the dichroic mirror 22 and made incident on an image forming region of the liquid crystal light modulation device 40G for green light. The red light transmitted through the dichroic mirror 22 is made incident on an image forming region of the liquid crystal light modulation device 40R for red light through the reflecting mirror 24 on an incident side, the relay lens 26, and the reflecting mirror 25 on an emission side.

As the liquid crystal light modulation device 40R, the liquid crystal light modulation device 40G, and the liquid crystal light modulation device 40B, a commonly-known liquid crystal light modulation device can be used. For example, the liquid crystal light modulation device is a light modulation device such as a liquid crystal light valve of a transmission type including a liquid crystal element 41 and a polarizing element 42 and a polarizing element 43 that hold the liquid crystal element 41 therebetween. For example, the polarizing element 42 and the polarizing element 43 are configured such that transmission axes thereof are orthogonal to each other (cross-Nichol arrangement).

The liquid crystal light modulation device 40R, the liquid crystal light modulation device 40G, and the liquid crystal light modulation device 40B modulate the color lights made incident thereon according to image information and form color images. The liquid crystal light modulation device 40R, the liquid crystal light modulation device 40G, and the liquid crystal light modulation device 40B are lit by the light source device 10A. Light modulation of the incident color lights is performed by the liquid crystal light modulation device 40R, the liquid crystal light modulation device 40G, and the liquid crystal light modulation device 40B.

For example, each of the liquid crystal light modulation device 40R, the liquid crystal light modulation device 40G, and the liquid crystal light modulation device 40B is a liquid crystal light modulation device of a transmission type in which liquid crystal is sealed and enclosed between a pair of transparent substrates. The liquid crystal light modulation device modulates, according to given image information, a polarizing direction of one kind of linearly polarized light emitted from the polarizing element 42 using a polysilicon TFT as a switching element.

The cross-dichroic prism 50 is an optical element that combines optical images modulated for each of the color lights emitted from the polarizing elements 43 to form a color image. The cross-dichroic prism 50 is formed in a substantial square shape in plan view obtained by sticking together four rectangular prisms. Dielectric multilayer films are formed on interfaces of a substantial X shape where the rectangular prisms are stuck together. The dielectric multilayer film formed on one interface of the substantial X shape reflects the red light and the dielectric multilayer film formed on the other interface reflects the blue light. The red light and the blue light are bent by the dielectric multilayer films and a traveling direction of the green light is aligned with the red light and the blue light, whereby the three color lights are combined.

The color image emitted from the cross-dichroic prism 50 is enlarged and projected by the projection optical system 60 to form an image on a screen SCR.

The first condensing lens 55 is made of, for example, a convex lens. The first condensing lens 55 is arranged on a ray axis of laser light emitted from the excitation light source 10. The first condensing lens 55 condenses the excitation light EL (a plurality of laser lights) emitted from the excitation light source 10 to set a condensing spot diameter equal to or smaller than 1 mm.

Figure 2:
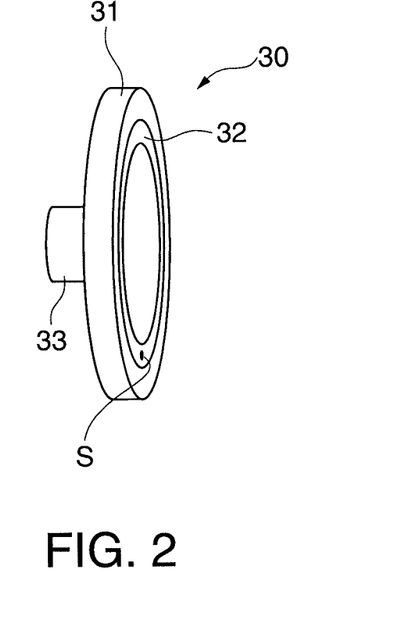
FIG. 2 is a perspective view showing the configuration of a rotating fluorescent plate.

The rotating fluorescent plate 30 is a rotating fluorescent plate of a so-called transmission type. In the rotating fluorescent plate 30, as shown in FIG. 2, a phosphor layer 32 is formed along a rotating direction of a disk-shaped substrate 31 driven to rotate by a motor 33. A region where the phosphor layer 32 is formed includes a region S on which the excitation light EL is made incident (hereinafter sometimes referred to as excitation light incident region S as well). As explained below, the phosphor layer 32 includes phosphor particles and a binder. The phosphor layer 32 is equivalent to the wavelength conversion element of the embodiment of the invention. The substrate 31 is driven to rotate about a rotation axis by the motor 33, whereby the excitation light incident region S moves relatively to the substrate 31 about the rotation axis.

The substrate 31 is made of a material that transmits the excitation light EL. As the material of the substrate 31, for example, quartz glass, crystal, sapphire, optical glass, or transparent resin can be used. A dielectric multilayer film 37 is provided between the substrate 31 and the phosphor layer 32. The dielectric multilayer film 37 functions as a dichroic mirror. The dielectric multilayer film 37 is configured to transmit light having wavelength near 450 nm, which is the excitation light EL, and reflect light having wavelength equal to or larger than 490 nm including a wavelength range (490 nm to 750 nm) of fluorescent light emitted from the phosphor layer 32. The shape of the substrate 31 is not limited to the disk shape.

The phosphor layer 32 rotates together with the substrate 31 at, for example, 7500 rpm during use. Although not explained in detail, the substrate 31 has a diameter of 50 mm. The substrate 31 is configured such that the optical axis of the excitation light EL made incident on the substrate 31 is located in a place about 22.5 mm apart from the rotation center of the substrate 31. In other words, the substrate 31 rotates at rotation speed at which a condensing spot of the excitation light EL moves on the phosphor layer 32 at speed of about 18 m/second.

In such a substrate 31, when the excitation light EL is made incident on the phosphor layer 32, a portion of the phosphor layer 32 corresponding to the excitation light incident region S generates heat. According to the rotation of the substrate 31, the portion that generates heat (the heat generating portion) repeats a cycle of moving while circling about the rotation axis and returning to the excitation light incident region S. In other words, it is possible to sequentially change an irradiation position of the excitation light EL on the phosphor layer 32. Consequently, the heat generating portion is cooled in a process of the movement.

The laser light (the blue light) emitted from the excitation light source 10 is made incident on the phosphor layer 32 as the excitation light EL via the dielectric multilayer film. The phosphor layer 32 emits the fluorescent light (the red light or the green light) to the opposite side of a side on which the excitation light EL is made incident.

The phosphor layer 32 includes phosphor particles that emit the fluorescent light. The phosphor layer 32 has a function of absorbing the excitation light EL (the blue light) and converting the excitation light EL into fluorescent light having wavelength of about 490 to 750 nm. The fluorescent light includes the green light (having wavelength near 530 nm) and the red light (having wavelength near 630 nm).

The phosphor particles are particulate phosphor materials that absorb the excitation light EL emitted from the excitation light source 10 and emit the fluorescent light. For example, the phosphor particles include substances excited by the blue light having wavelength of about 450 nm to emit the fluorescent light. The phosphor particles convert a part of the excitation light EL into light (yellow light) including wavelength bands from a wavelength band of red to a wavelength band of green for emission. A part of the excitation light EL is not converted into the yellow light. In other words, white light including red, green, and blue is emitted from the light source device 10A.

As the phosphor particles, commonly-known YAG (yttrium-aluminum-garnet) phosphors can be used. For example, YAG phosphors having a composition indicated by $(Y, Gd)_3(AL, Ga)_5O_{12}$:Ce and an average particle diameter of 10 μm can be used. The phosphor particles may be formed using one kind of a material. Alternatively, a mixture of particles formed using two or more kinds of materials may be used as the phosphor particles.

The collimate optical system 85 is arranged on the optical path of the light (the excitation light EL and the fluorescent light) between the rotating fluorescent plate 30 and the second condensing lens 90. The collimate optical system 85 includes a first lens 81 that suppresses the spread of the light from the rotating fluorescent plate 30, a second lens 82 that parallelizes the light made incident from the first lens 81, and a base section 83 that fixes the lenses. The first lens 81 is made of, for example, a convex meniscus lens. The second lens 82 is made of, for example, a convex lens. The collimate optical system 85 makes the light from the rotating fluorescent plate 30 incident on the second condensing lens 90 in a substantially parallelized state. Since the light (the fluorescent light) emitted from the phosphor layer 32 is emitted in a Lambertian pattern, the collimate optical system 85 is arranged in a state in which the collimate optical system 85 is close to the rotating fluorescent plate 30. Specifically, for example, a gap between the collimate optical system 85 and the rotating fluorescent plate 30 is set to about 1 mm.

The second condensing lens 90 is made of, for example a convex lens. The second condensing lens 90 is arranged on a ray axis of the light transmitted through the collimate optical system 85 (the second lens 82). The second condensing lens 90 condenses the light transmitted through the collimate optical system 85.

The light transmitted through the second condensing lens 90 is made incident on one end side of the rod integrator 80. The rod integrator 80 is a prism-like optical member that extends in the optical path direction. The rod integrator 80 causes multiple reflection of the light transmitted therethrough to thereby mix the light transmitted through the second condensing lens 90 and uniformalize a luminance distribution. A sectional shape of the rod integrator 80 orthogonal to the optical path direction is substantially similar to an external shape of the image forming regions of the liquid crystal light modulation device 40R, the liquid crystal light modulation device 40G, and the liquid crystal light modulation device 40B.

The light emitted from the other end side of the rod integrator 80 is parallelized by the parallelizing lens 70 and emitted from the light source device 10A.

The inventors have found that light emission efficiency of the phosphor layer 32 of the rotating fluorescent plate 30 depends on an amount of phosphors (phosphor particles) contained in the thickness direction of the phosphor layer 32. Specifically, when the amount of phosphors is small, since components of excitation light not converted into fluorescent light increase, the light emission efficiency decreases. On the other hand, when the amount of phosphors is too large, since fluorescent light emitted by some phosphors and absorbed by the other phosphors increases, the light emission efficiency decreases. The light emission efficiency is specified by a ratio of a light amount of the fluorescent light emitted from the phosphor layer 32 to a light amount of the excitation light EL irradiated on the phosphor layer 32 from the excitation light source 10. When the light emission efficiency is 100%, this means that the light amount of the excitation light EL radiated from the excitation light source 10 and the light amount of the fluorescent light converted and emitted by the phosphor layer 32 are the same.

Figure 3A:
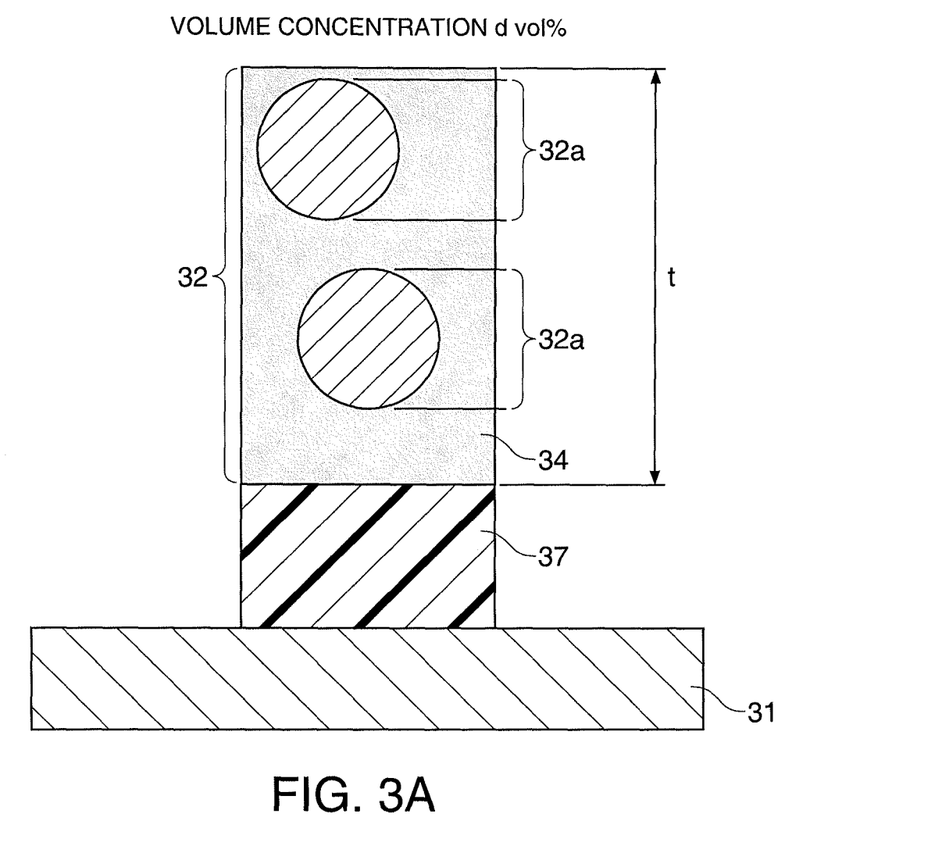
FIGS. 3A and 3B are schematic diagrams showing the configuration of a phosphor layer.
Figure 3B:
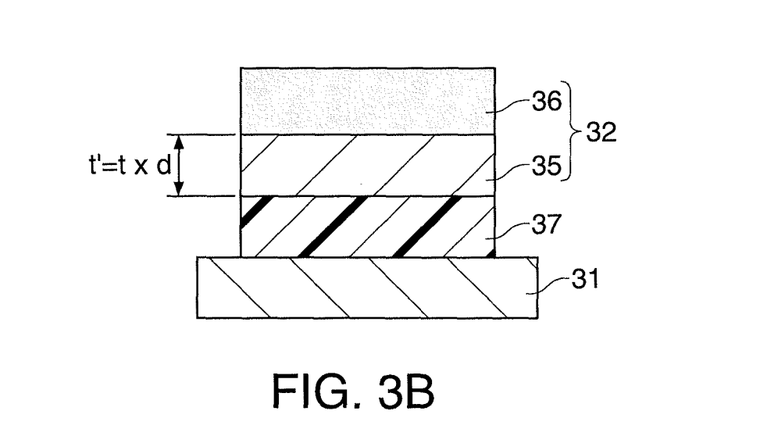

FIGS. 3A and 3B are schematic diagrams for explaining a method of obtaining, on the basis of the thickness of the phosphor layer 32 and the volume concentration of the phosphors in the phosphor layer 32, the thickness of a phosphor region 35 contained in the thickness direction of the phosphor layer 32. As shown in FIG. 3A, the phosphor layer 32 includes a binder 34 and a plurality of phosphor particles 32a formed on the dielectric multilayer film 37. The plurality of phosphor particles 32a is dispersed in the binder 34. In FIG. 3A, only a part of the phosphor layer 32, in which the plurality of phosphor particles 32a is dispersed in the binder 34, is schematically shown.

As the binder 34, a resin material having light transmittance can be used. Above all, silicone resin having high heat resistance can be suitably used.

It is assumed that the phosphor layer 32, in which the plurality of phosphor particles 32a is dispersed in the binder 34 as shown in FIG. 3A, includes a binder region 36 and the phosphor region 35 separated from each other as shown in FIG. 3B. The phosphor region 35 includes only the phosphor particles 32a. The binder region 36 includes a material other than the phosphor particles 32a.

The thickness of the phosphor region 35 is obtained by multiplying the thickness of the phosphor layer 32 by the volume concentration of the phosphors. The volume concentration of the plurality of phosphor particles 32a in the phosphor layer 32 is equivalent to the volume concentration of the phosphors in the phosphor layer 32. In FIG. 3A, the thickness of the phosphor layer 32 is represented as t and the volume concentration of the phosphors is represented as d vol %. In FIG. 3B, the thickness of the phosphor region 35 is represented as t'. In this case, the thickness t' of the phosphor region 35 is obtained by an expression $t'=t \times d/100$.

Figure 4:
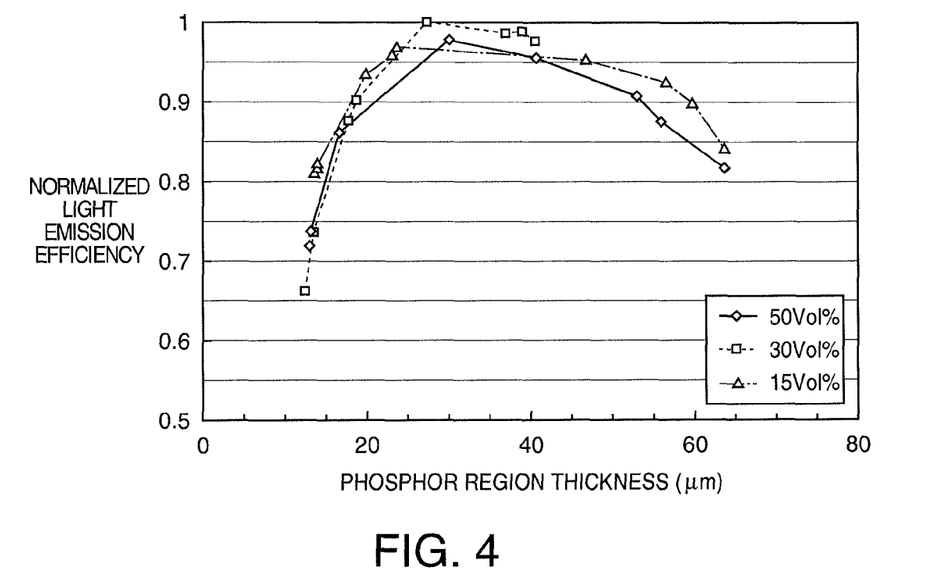
FIG. 4 is a graph showing a relation between the thickness of a phosphor region and normalized light emission efficiency of the phosphor layer.

FIG. 4 is a graph showing a relation between the thickness (unit: μm) of the phosphor region 35 and normalized light emission efficiency of the phosphor layer 32. In FIG. 4, the relation is shown at the volume concentration of the phosphors set to 15 vol %, 30 vol %, and 50 vol %. The normalized light emission efficiency shown in FIG. 4 is normalized with reference to a maximum value of the light emission efficiency obtained when the volume concentration is 30 vol %. When the volume concentration is 30 vol %, sufficiently high light emission efficiency in practice can be obtained.

It can be confirmed from the graph of FIG. 4 that, when the thickness t' of the phosphor region 35 is smaller than 15 μm, the light emission efficiency suddenly decreases and the normalized light emission efficiency is lower than 0.85. A reason for this is considered as explained below. When the thickness t' of the phosphor region 35 is smaller than 15 μm, the number of the phosphor particles 32a dispersed in the phosphor layer 32 decreases and gaps among the phosphor particles 32a increase in size. As a result, components of the excitation light EL not made incident on any of the phosphor particles 32a and not converted into fluorescent light increase.

On the other hand, it can be confirmed that, if the thickness t' of the phosphor region 35 is equal to or larger than 15 μm, the normalized light emission efficiency higher than the normalized light emission efficiency obtained when the thickness t' is smaller than 15 μm can be obtained. Therefore, it is desirable to set the thickness t' of the phosphor region 35 equal to or larger than 15 μm. With the phosphor layer 32 having the phosphor region 35 formed at such thickness, it is possible to generate the fluorescent light at high efficiency according to the irradiation of the excitation light EL.

If the thickness t' of the phosphor region 35 is set equal to or larger than 20 μm, the light emission efficiency further increases. The normalized light emission efficiency equal to or higher than about 0.9 can be obtained. Therefore, it is more desirable to set the thickness t' of the phosphor region 35 equal to or larger than 20 μm.

It is desirable to set the thickness t' of the phosphor region 35 equal to or smaller than 60 μm. It can be confirmed from the graph of FIG. 4 that, when the thickness t' of the phosphor region 35 is larger than 60 μm, the normalized light emission efficiency decreases to be lower than 0.85. A reason for this is considered as explained below. When the thickness t' of the phosphor region 35 is larger than 60 μm, the number of the phosphor particles 32a dispersed in the phosphor layer 32 increases and the gaps among the phosphor particles 32a decrease in size. As a result, since the fluorescent light emitted from some phosphor particles 32a is absorbed by the other phosphor particles 32a, the light emission efficiency decreases.

If the thickness t' of the phosphor region 35 is equal to or smaller than 55 μm, the normalized light emission efficiency equal to or higher than about 0.9 can be obtained. Therefore, it is desirable to set the thickness t' of the phosphor region 35 equal to or smaller than 55 μm.

It is desirable to set the volume concentration of the phosphors equal to or higher than 15 vol % and equal to or lower than 50 vol %. It can be confirmed from the graph of FIG. 4 that, if the volume concentration of the phosphors is set equal to or higher than 15 vol % and equal to or lower than 50 vol %, high normalized light emission efficiency equal to or higher than 0.85 can be obtained. A ground for setting the volume concentration in a range of 15 vol % to 50 vol % will be explained with reference to FIGS. 5, 6, and 7.

Figure 5:
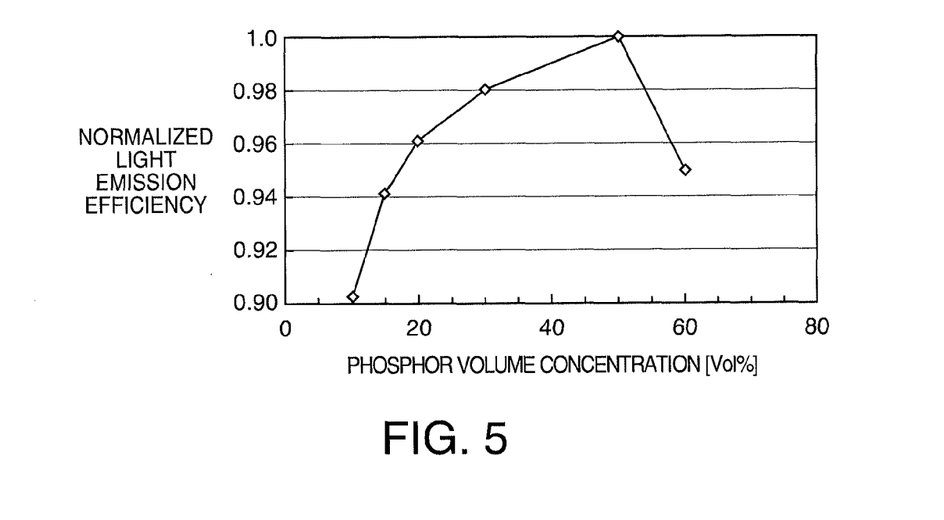
FIG. 5 is a graph showing a relation between volume concentration and normalized fluorescent light capturing efficiency.

FIG. 5 is a graph showing a relation between the volume concentration of the phosphors and normalized fluorescent light capturing efficiency obtained when the thickness t' of the phosphor region 35 is fixed. The fluorescent light capturing efficiency shown in FIG. 5 is normalized with reference to fluorescent light capturing efficiency obtained when the volume concentration is 50 vol %. When the volume concentration is 50 vol %, sufficiently high fluorescent light capturing efficiency in practice (e.g., equal to or higher than 90%) can be obtained. The fluorescent light capturing efficiency indicates a ratio of the fluorescent light captured by the collimate optical system 85 to the fluorescent light emitted from the phosphor layer 32. When the fluorescent light capturing efficiency is 100%, this means that the entire fluorescent light from the phosphor layer 32 is captured by the collimate optical system 85.

Figure 6A:
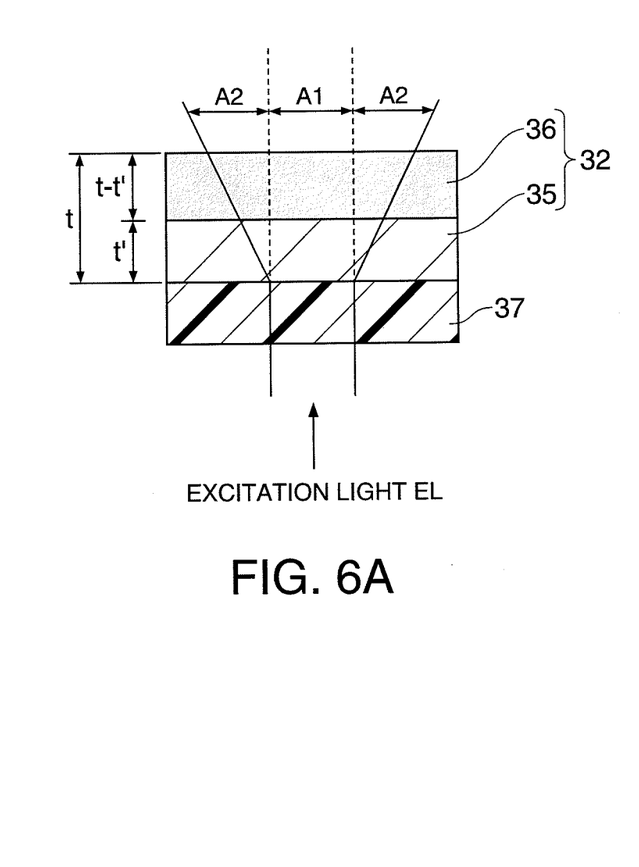
FIGS. 6A and 6B are diagrams for explaining the fluorescent light capturing efficiency.
Figure 6B:
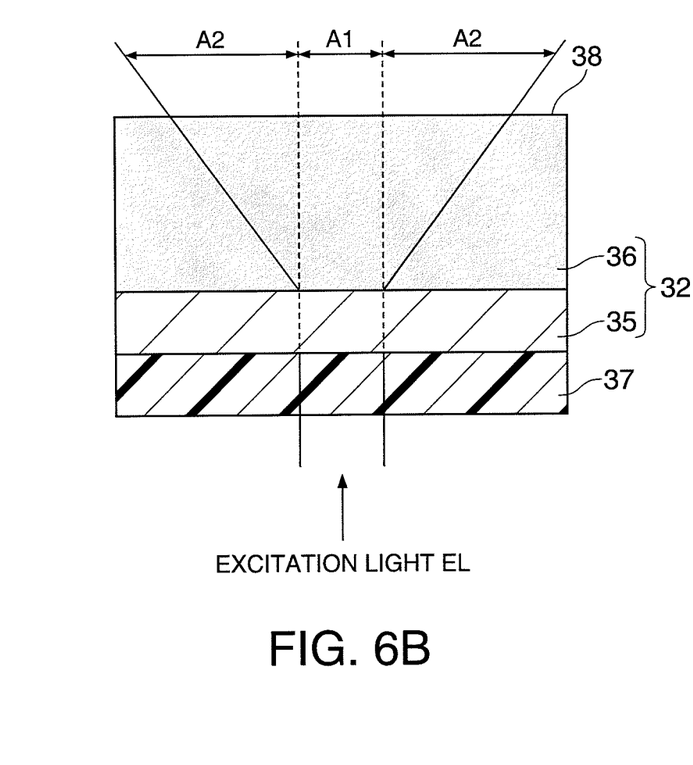

FIGS. 6A and 6B are schematic diagrams for explaining the fluorescent light capturing efficiency. FIG. 6A is a schematic diagram for explaining the fluorescent light capturing efficiency obtained when the volume concentration of the phosphors in the phosphor layer 32 is 50 vol %. FIG. 6B is a schematic diagram for explaining the fluorescent light capturing efficiency obtained when the volume concentration of the phosphors in the phosphor layer 32 is 30 vol %.

In FIGS. 6A and 6B, the substrate 31 is not shown. However, as explained above, the dielectric multilayer film 37 is provided between the substrate 31 and the phosphor layer 32. Therefore, the fluorescent light emitted from the phosphor particles 32a is emitted from an emission surface 38 of the phosphor layer 32 on the opposite side of the dielectric multilayer film 37. As shown in FIGS. 6A and 6B, when the fluorescent light emitted from the phosphor particles 32a is guided through the phosphor layer 32 toward the emission surface 38, the fluorescent light is affected by the binder region 36 to spread to the outer side viewed from the optical axis direction of the excitation light EL. A region A1 in FIGS. 6A and 6B indicates a region including components captured by the collimate optical system 85 in the fluorescent light emitted from the phosphor layer 32. A region A2 indicates a region including components not captured by the collimate optical system 85 in the fluorescent light emitted from the phosphor layer 32.

A ratio of the binder region 36 in the phosphor layer 32 is larger when the volume concentration is 30 vol % than when the volume concentration is 50 vol %. As shown in FIGS. 6A and 6B, if the thickness t' of the phosphor region 35 is the same, the thickness (t−t') of the binder region 36 is larger when the volume concentration is 30 vol % than when the volume concentration is 50 vol %. When the binder region 36 is thick in this way, the spread of the fluorescent light increases. Therefore, the ratio of the region A2 including the components not captured by the collimate optical system 85 in the fluorescent light increases.

It can be confirmed from the graph of FIG. 5 that, when the volume concentration is lower than 15 vol %, the normalized fluorescent light capturing efficiency suddenly decreases. This is considered to be because, since the thickness of the binder region 36 in the phosphor layer 32 increases, the components not captured by the collimate optical system 85 in the fluorescent light suddenly increase. Therefore, if the volume concentration is set equal to or higher than 15 vol %, it is possible to efficiently use the fluorescent light.

Figure 7:
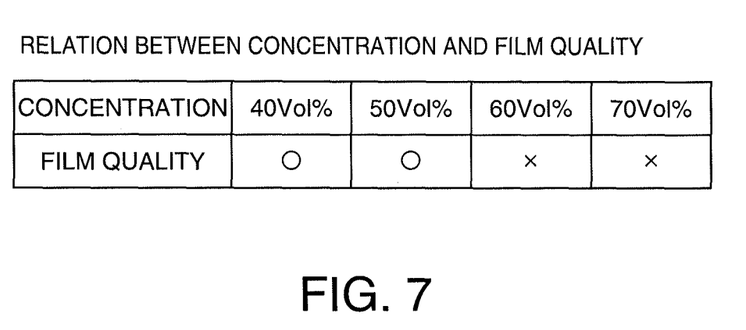
FIG. 7 is a table showing a relation between the film quality and the volume concentration of the phosphor layer.

FIG. 7 is a table showing a relation between the film quality and the volume concentration of the phosphor layer 32. FIG. 7 indicates that the film quality is deteriorated when the volume concentration of the phosphors is higher than 50 vol % and is specifically 60 vol % and 70 vol %. The deterioration in the film quality means that the surface of a manufactured film becomes porous. This is because, when the volume concentration is too high, it is difficult to satisfactorily form the phosphor layer 32. The phosphor layer 32 having such deteriorated film quality cannot satisfactorily generate the fluorescent light. The normalized light emission efficiency of 0.85 cannot be obtained. It is hard to say that sufficient light emission efficiency can be obtained. Therefore, if the volume concentration is set equal to or lower than 50 vol %, the excitation light can be efficiently converted into the fluorescent light and sufficiently high normalized light emission efficiency can be obtained. Because of the reasons explained above, it is desirable to set the volume concentration of the phosphors equal to or higher than 15 vol % and equal to or lower than 50 vol %.

The phosphor layer 32 (the wavelength conversion element) according to this embodiment can generate the fluorescent light at high efficiency. Therefore, the light source device 10A including the wavelength conversion element according to this embodiment can generate the fluorescent light at high efficiency.

As explained above, with the projector 100 according to this embodiment, since the projector 100 includes the light source device 10A that generates the fluorescent light at high light emission efficiency, the projector 100 itself has high light emission efficiency and high reliability.

The invention is not limited to the embodiment and can be changed as appropriate without departing from the spirit of the invention.

The entire disclosure of Japanese Patent Application No. 2012-024055, filed on Feb. 7, 2012 is expressly incorporated by reference herein.

What is claimed is:

1. A light source device comprising:
a wavelength conversion element comprising a phosphor layer, the phosphor layer including phosphors and a binder; and
an excitation light source configured to excite the wavelength conversion element, wherein
a thickness of a phosphor region in an entirety of a region of the wavelength conversion element that is irradiated with an excitation light from the excitation light source is equal to or larger than 15 μm, the thickness obtained by multiplying a thickness of the phosphor layer by a volume concentration of the phosphors.

2. The light source device according to claim 1, wherein the thickness of the phosphor region is equal to or larger than 20 μm.

3. The light source device according to claim 1, wherein
the thickness of the phosphor region is equal to or smaller than 60 μm.

4. The light source device according to claim 3, wherein
the thickness of the phosphor region is equal to or smaller than 55 μm.

5. The light source device according to claim 1, wherein
the volume concentration of the phosphors is set equal to or higher than 15 vol % and equal to or lower than 50 vol %.

6. The light source device according to claim 1, wherein
the phosphor layer emits light including any one or more colors of red and green according to irradiation of excitation light.

7. The light source device according to claim 1, wherein the excitation light source is a solid-state light-emitting element that emits light in a blue wavelength band.

8. The light source device according to claim 7, wherein the excitation light source includes a plurality of the solid-state light-emitting elements.

9. The light source device according to claim 1, wherein the excitation light source is a laser diode.

10. The light source device according to claim 1, wherein an irradiation position of excitation light on the phosphor layer by the excitation light source is sequentially changed by rotating the phosphor layer.

11. A projector comprising:
the light source device according to claim 1;
a light modulation element configured to modulate, according to an image signal, light emitted from the light source device; and
a projection optical system configured to project the light modulated by the light modulation element.

12. A projector comprising:
the light source device according to claim 7;
a light modulation element configured to modulate, according to an image signal, light emitted from the light source device; and
a projection optical system configured to project the light modulated by the light modulation element.

13. A projector comprising:
the light source device according to claim 8;
a light modulation element configured to modulate, according to an image signal, light emitted from the light source device; and
a projection optical system configured to project the light modulated by the light modulation element.

14. A projector comprising:
the light source device according to claim 9;
a light modulation element configured to modulate, according to an image signal, light emitted from the light source device; and
a projection optical system configured to project the light modulated by the light modulation element.

* * * * *